United States Patent
Yu et al.

(10) Patent No.: US 11,265,270 B2
(45) Date of Patent: Mar. 1, 2022

(54) SYSTEMS, METHODS AND COMPUTER PROGRAM PRODUCTS FOR PROVIDING ENHANCED CHAT SERVICES

(71) Applicant: SamChat, Inc., Los Gatos, CA (US)

(72) Inventors: John Yu, Los Gatos, CA (US); James Keener Fox, San Jose, CA (US)

(73) Assignee: SamChat, Inc., Los Gatos, CA (US)

( * ) Notice: Subject to any disclaimer, the term of this patent is extended or adjusted under 35 U.S.C. 154(b) by 0 days.

(21) Appl. No.: 16/629,250

(22) PCT Filed: Jul. 6, 2018

(86) PCT No.: PCT/US2018/041004
§ 371 (c)(1),
(2) Date: Jan. 7, 2020

(87) PCT Pub. No.: WO2019/010362
PCT Pub. Date: Jan. 10, 2019

(65) Prior Publication Data
US 2020/0137004 A1    Apr. 30, 2020

Related U.S. Application Data

(60) Provisional application No. 62/586,956, filed on Nov. 16, 2017, provisional application No. 62/529,824, filed on Jul. 7, 2017.

(51) Int. Cl.
| | |
|---|---|
| *H04L 12/58* | (2006.01) |
| *G06Q 10/10* | (2012.01) |
| *H04L 29/08* | (2006.01) |
| *H04L 51/04* | (2022.01) |
| *H04L 51/02* | (2022.01) |

(Continued)

(52) U.S. Cl.
CPC .......... *H04L 51/04* (2013.01); *G06Q 10/107* (2013.01); *H04L 51/02* (2013.01); *H04L 51/32* (2013.01); *H04L 67/02* (2013.01)

(58) Field of Classification Search
CPC ......... H04L 51/04; H04L 51/02; H04L 51/32; H04L 67/02; G06Q 10/107; G06Q 30/0207; G06Q 30/0242
See application file for complete search history.

(56) References Cited

U.S. PATENT DOCUMENTS

| | | |
|---|---|---|
| 2007/0220090 A1 | 9/2007 | Hall |
| 2014/0195626 A1 | 7/2014 | Ruff et al. |

(Continued)

OTHER PUBLICATIONS

International Search Report and Written Opinion for application, dated Oct. 18, 2018, 18 pages.

*Primary Examiner* — El Hadji M Sall
(74) *Attorney, Agent, or Firm* — Cantor Colburn LLP

(57) ABSTRACT

A method for providing messaging services includes accessing an organization structure of an organization; creating chat services user accounts in response to the organization structure of the organization; creating groups of users in response to the organization structure of the organization, the groups comprising a chat group and a broadcast chat group; wherein the chat group provides bidirectional messaging from each member of the chat group to each other member of the chat group; wherein broadcast chat group provides unidirectional messaging from a broadcast group owner to each other member of the broadcast chat group.

11 Claims, 21 Drawing Sheets

(51) Int. Cl.
*H04L 51/52* (2022.01)
*H04L 67/02* (2022.01)

(56) References Cited

U.S. PATENT DOCUMENTS

2015/0244656 A1    8/2015  Choi et al.
2018/0351903 A1*  12/2018  Allen ..................... H04L 51/04

* cited by examiner

| ALL | INTERNAL | EXTERNAL |
|---|---|---|
| Kevin McCarthy<br>Steve Scalise<br>Cathy Rodgers<br>Luke Messer<br>Lynn Jenkins<br>Jason Smith<br>Greg Walden<br>Nancy Pelosi<br>Steny Hoyner<br>Jim Clyburn<br>Joseph Crowley<br>Linda Sanchez<br>Ben Lujan | Kevin McCarthy<br>Steve Scalise<br>Cathy Rodgers<br>Luke Messer<br>Lynn Jenkins<br>Jason Smith<br>Greg Walden | Nancy Pelosi<br>Steny Hoyner<br>Jim Clyburn<br>Joseph Crowley<br>Linda Sanchez<br>Ben Lujan |

SYSTEMS, METHODS AND COMPUTER PROGRAM PRODUCTS FOR PROVIDING ENHANCED CHAT SERVICES

BACKGROUND

The present disclosure relates generally to messaging services, and more particularly to systems, methods and computer program products for providing enhanced chat services in a business environment.

Existing messaging services, such as chat systems, are useful for providing communications between users. In a business context, however, existing messaging systems have drawbacks. Some existing messaging systems are based off social media platforms and require that users be associated with each other (e.g., friends or buddies) in order to provide messaging services. This requires users to be associated with (e.g., "friend") a business in order to enable messaging services. Users are often reluctant to add a business to their social network contacts, and thus businesses are not able to reach many users of conventional messaging services.

Large businesses may develop and launch their own mobile applications, and include push notifications to users who have installed the application on a device (e.g., a mobile device or personal computer). Unfortunately, most businesses do not have the resources to develop and launch a specialized application in order to reach customers.

Accordingly, improved messaging services, particularly for businesses, would be well received in the art.

BRIEF DESCRIPTION OF DRAWINGS

Referring now to the drawings wherein like elements are numbered alike in the several FIGURES:

FIG. 8 depicts organizing users as internal users or external users in an example embodiment;

FIG. 16 depicts messages with embedded executable commands in an example embodiment;

DETAILED DESCRIPTION

Figure 1:
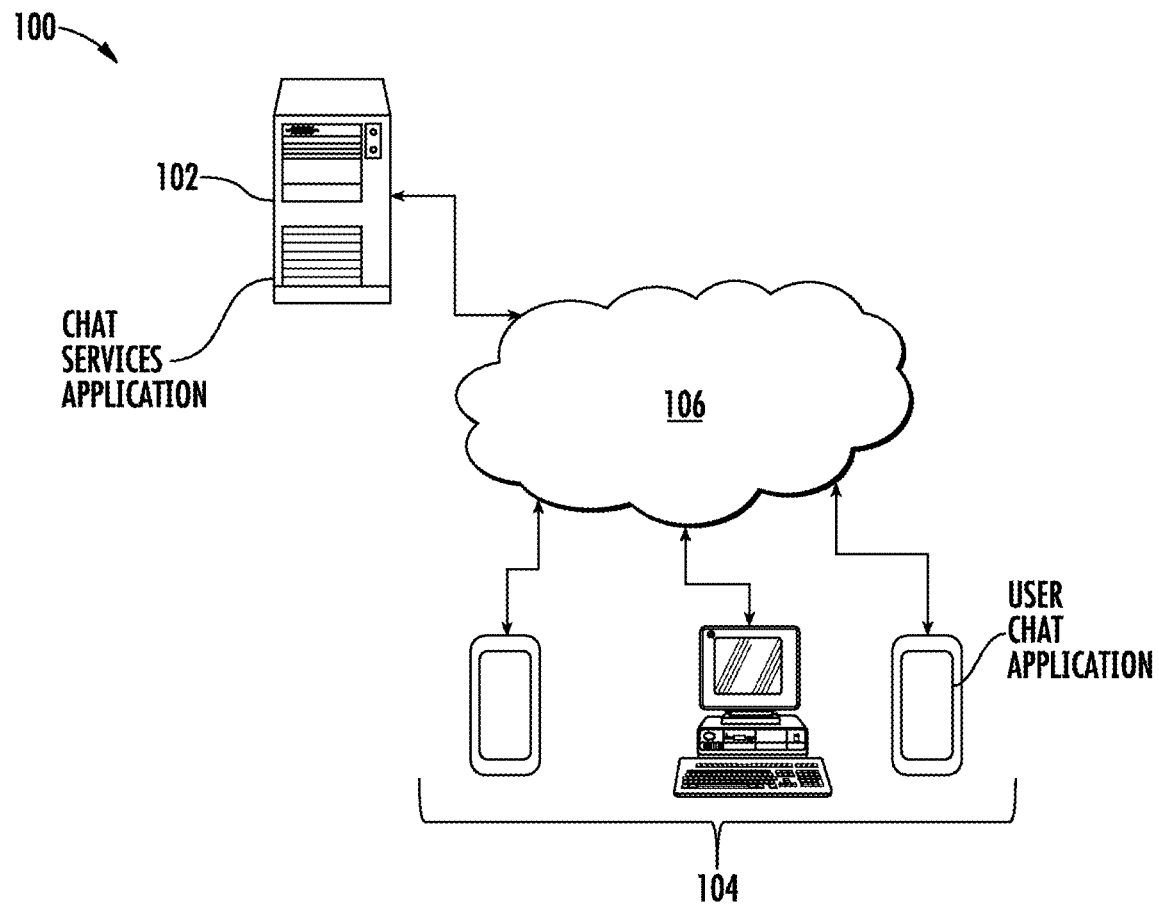
FIG. 1 depicts a system for providing enhanced messaging services in accordance with an example embodiment.

FIG. 1 depicts a system 100 for providing enhanced messaging services, such as chat services, in accordance with an example embodiment. The system 100 includes a chat server 102 and user devices 104 communicatively coupled to one or more networks 106. The chat server 102 may be operated by an enterprise hosting the chat services. In one embodiment, the chat server 102 may be operated by a business enterprise that provides a user chat application and provides chat services to users of the user chat application. The chat server 102 executes a chat services application to provide the functions described herein. The chat server 102 may be implemented as a high-speed computer processing device, (e.g., a mainframe computer). In an embodiment, the chat server 102 includes typical computer server components including a processor, memory and a network interface. Although a single chat server 102 is depicted in FIG. 1, it is understood that chat server 102 may be implemented using multiple computing systems. Chat server 102 may also be implemented using a distributed computing network (e.g., cloud computing architecture).

The user devices 104 may be computer processing devices operated by users of the chat services. The user devices 104 may include wireless mobile devices, such as a tablet PC or smartphone, as well as wired devices, such as a general-purpose computer or laptop. The user devices 104 may be equipped with communications components (e.g., cellular, LAN, wireless LAN, NFC, Bluetooth, USB, etc.) for communicating over wireless or wired communications mediums. In an embodiment, the user devices 104 include typical components including a processor, memory and a network interface. The user devices 104 execute a user chat application to provide functionality described herein.

The chat server 102 executes the chat services application to distribute messages to user devices 104. Chat messages are created at a user device 104. Each recipient of a message is associated with a unique ID (identification, which is in turn associated with a unique IP address) assigned to each user by the chat server 102. When a user sends a message from a user device 104, the message is received by chat server 102 and then posted to the account(s) associated with the unique ID of the recipient(s).

Network 106 may include a variety of network elements, including area networks, private networks, and the Internet. The networks may include wireless networks, such as cellular, satellite and terrestrial networks. Communications may be conducted between the chat server 102 and the user devices 104 via wireless transmissions, such as ultra mobile broadband (UMB), long term evolution (LTE), and IEEE 802.11, as well as via wired links, such as twisted pair link, a T1/E1 phone line, an AC line, an optical fiber line, and coaxial cable, to name a few. In example embodiments, the user devices 104 communicate over multiple independent wired and/or wireless networks. Embodiments are intended to cover a wide variety of types of communication between the user devices 104 and the chat server 102. Thus, embodiments are not limited to the examples provided in this disclosure.

The chat server 102 provides chat services by executing one or more computer programs stored in memory. The chat server 102 executes a chat services application that provides for sending messages between user devices 104 and also allows an administrator of an organization to define various messaging parameters. One or more user devices 104 may access the chat server 102 as an administrator by submitting appropriate credentials (e.g., user name and password).

Figure 2:
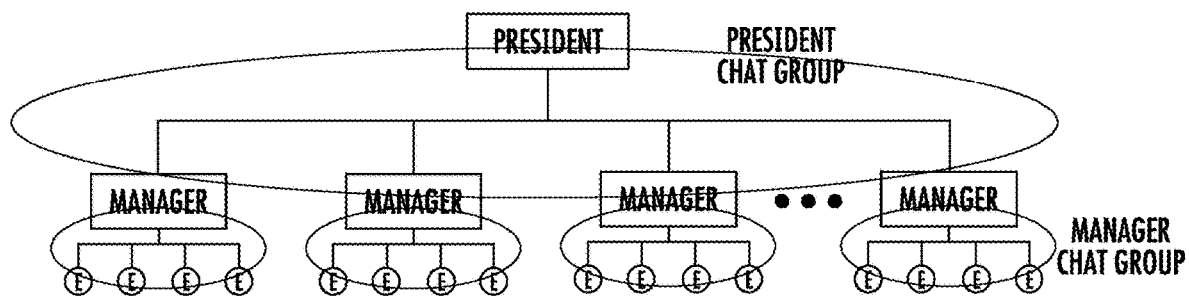
FIG. 2 depicts creation of chat groups in an example embodiment.

The chat server 102 allows an administrator to define groups in response to the organization of the entity utilizing the chat services. The creation of user accounts and creation of groups may be implemented using a top-down approach, using the organization structure of the organization (company, school, medical office, government office, etc.). FIG. 2 depicts an example organization structure for an organization (e.g., a private business). An administrator may create a directory of user accounts for every employee who needs chat services. The directory of user accounts for chat services is based off an organization employee list and individual employees cannot remove themselves from the directory of user accounts for chat services.

Based on the organization structure of the organization, the administrator creates groups of users, including chat groups and broadcast chat groups. A chat group is a messaging group that allows all members of the messaging group to send messages and reply to messages to members of that chat group (e.g., bidirectional messaging). A message in a chat group includes a list of recipients viewable by members of that chat group. All members in a chat group are aware of each other's presence in the chat group. The chat group may have a chat group owner who has the authority to add and remove users from the chat group.

A broadcast chat group is a messaging group that allows an owner of that broadcast chat group to send messages to members of that group. The broadcast chat group may have a broadcast chat group owner who has the authority to add and remove users from the broadcast chat group. In a broadcast chat group, the individual members (other than the owner) cannot send a message to the broadcast chat group nor can the individual members reply to a message sent to the broadcast chat group (e.g., unidirectional messaging from group owner to other members). Also, the individual members (other than the owner) cannot view a recipient list of a message sent to the broadcast chat group. In other words, a message in a broadcast chat group does not include a list of recipients. All members in a broadcast chat group are not aware of each other's presence in the broadcast chat group.

In the example in FIG. 2, a president chat group is formed between the president and a level of managers directly below the president. Manager chat groups are formed between each manager and their respective employees.

Figure 3:
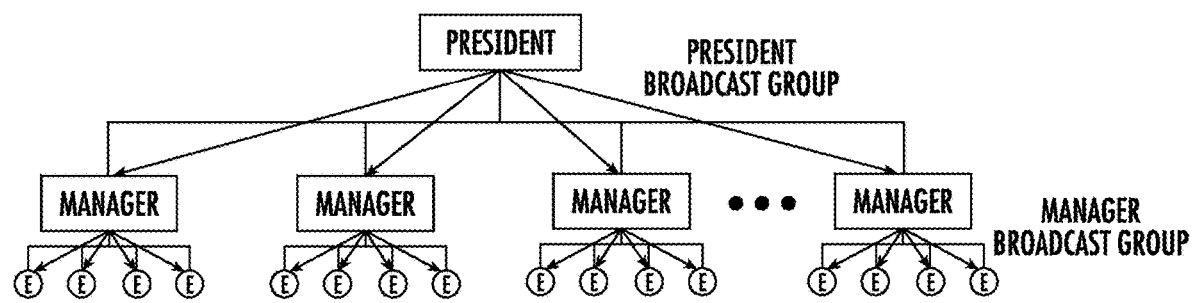
FIG. 3 depicts creation of broadcast chat groups in an example embodiment.

In the example in FIG. 3, a president broadcast chat group is formed between the president and a level of managers directly below the president. Manager broadcast chat groups are formed between each manager and their respective employees.

Figure 4:
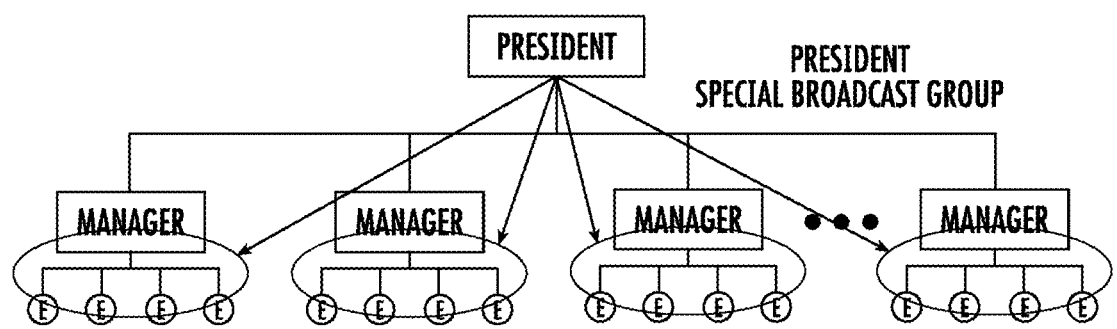
FIG. 4 depicts creation of a broadcast chat group in an example embodiment.

The chat server 102 allows creation of a wide variety of messaging groups. In the example in FIG. 4, a multi-level broadcast chat group is created for the president to reach all employees. The president is the group owner and all the manager broadcast chat groups (see FIG. 3) are members of the president broadcast chat group. FIG. 4 depicts an example of a broadcast chat group being a member of another broadcast chat group. In other words, the users in each manager broadcast chat group (FIG. 3) are also members of the president broadcast chat group (FIG. 4).

Figure 5:
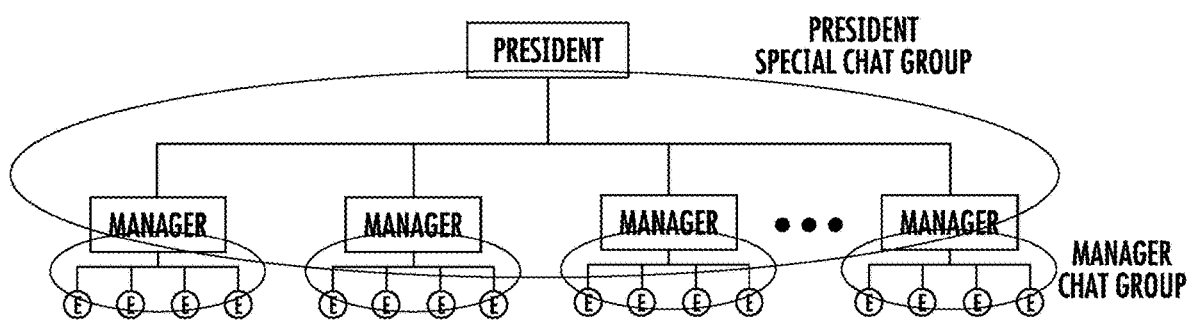
FIG. 5 depicts creation of a chat group in an example embodiment.

In the example in FIG. 5, a multi-level chat group is created for the president to reach all employees. All the manager chat groups (see FIG. 2) are members of the president chat group. FIG. 5 depicts an example of a chat group being a member of another chat group. In other words, the users in each manager chat group (FIG. 2) are also members of the president chat group (FIG. 5).

Figure 6:
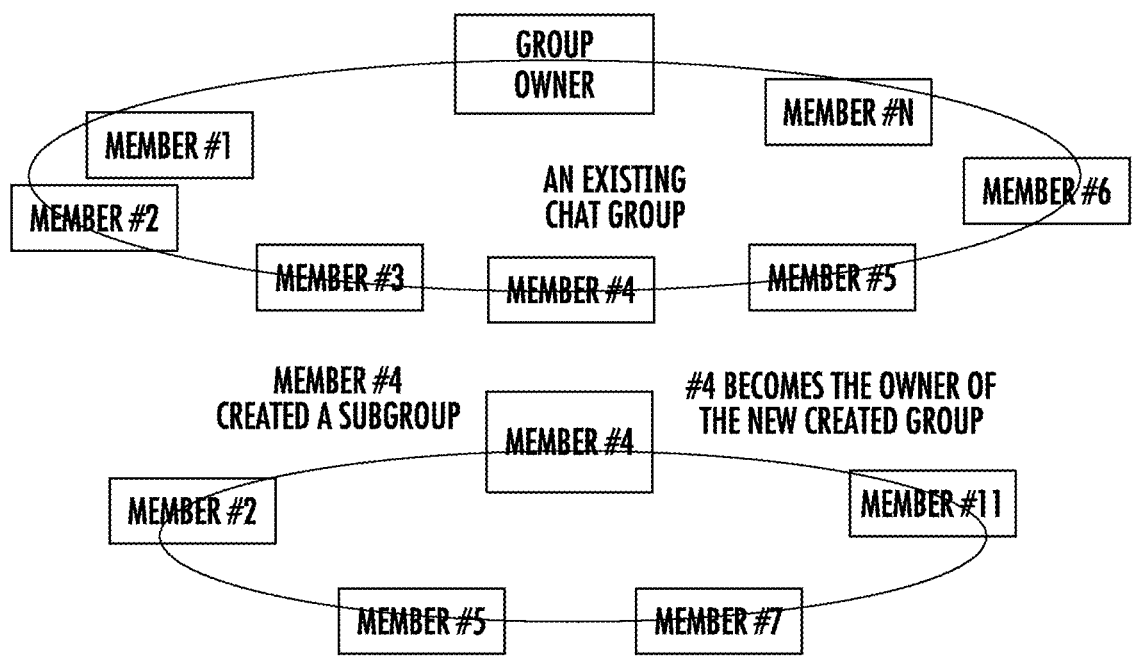
FIG. 6 depicts creation of a chat sub-group in an example embodiment.

FIG. 6 depicts an example of a sub-group. Any chat group member (including the chat group owner) is able to select a subset of other group members to construct a new chat sub-group. As shown in FIG. 6, member 4 of an existing chat group forms a chat sub-group including members 2, 4, 5, 7 and 11. Member 4 is the owner of the chat sub-group. This chat sub-group is an independent new chat group with no association with the original chat group.

Figure 7:
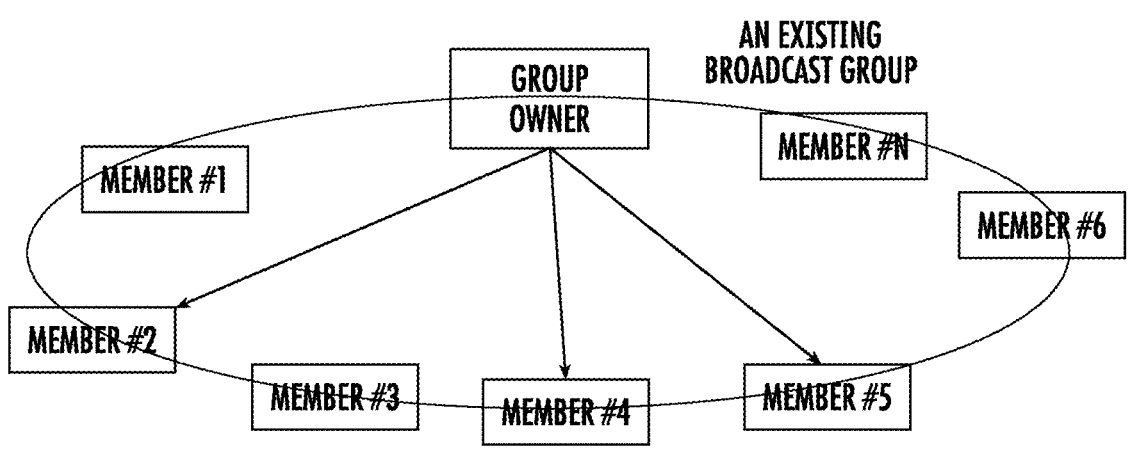
FIG. 7 depicts sending a broadcast chat message to selected members of a broadcast chat group in an example embodiment.

FIG. 7 depicts an example of how an owner of a broadcast chat group can selectively send messages to members of the broadcast chat group. The owner of a broadcast chat group can select a subset of total members to deliver a new broadcast message. As shown in FIG. 7, the owner has excluded members 1, N and 6 from receiving the broadcast message. After the first message is sent, the owner has the option to create a new broadcast chat group, or no new group created (i.e., one time sub-group messaging).

FIG. 8 depicts how users of the chat messaging services may be arranged as internal users or external users. Members of the organization (e.g., employees) are listed on an internal list, while a non-members of the organization (customer, client, etc.) are listed on an external list. The internal list may correspond to an organization contact list maintained by an administrator. The internal list may be augmented with a variety of lists including company report chain list, customer list based on associated sales persons, etc. An invitation of an external member from outside the organization results in an external group type.

Figure 9:
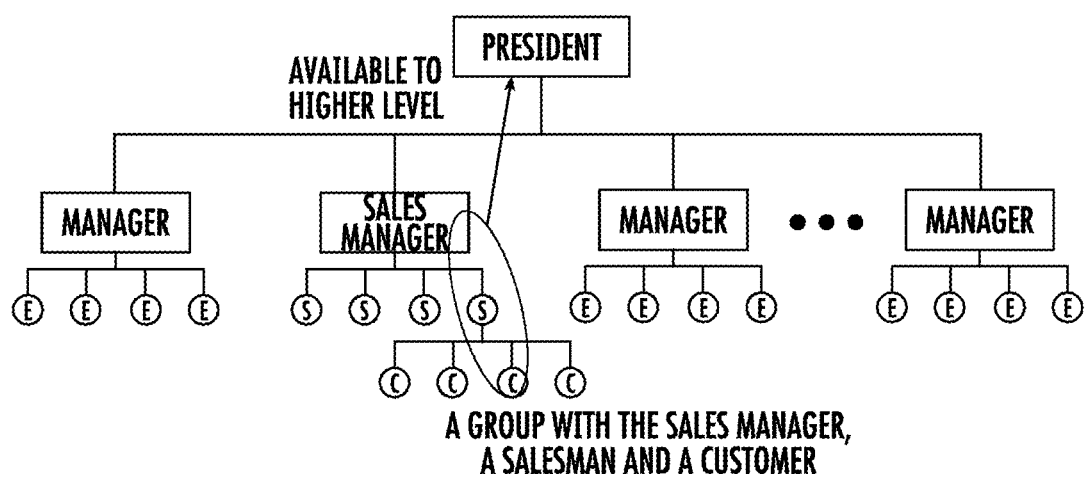
FIG. 9 depicts reporting chat parameters in an example embodiment.

The hierarchical arrangement of messaging groups allows for messaging activity to be reported within an organization. FIG. 9 depicts an example of a chat group formed between a sales manager, salesman and a customer. Messaging activity of this chat group is collected by the chat server 102. The messaging activity (e.g., number of messages, date/time of messages, from-to, subject field, etc.) for this chat group may reported periodically on a regular basis or on demand to users at a higher level in the organization structure.

Figure 10:
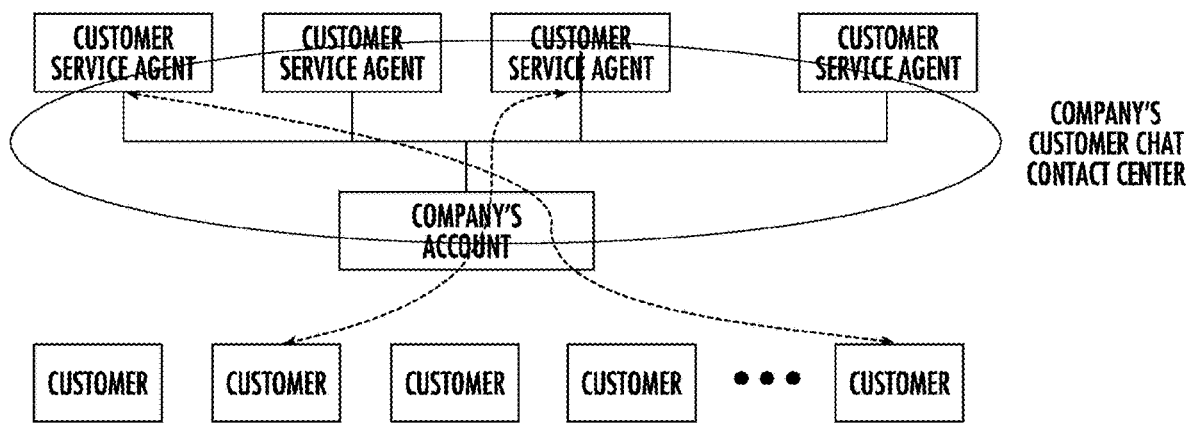
FIG. 10 depicts providing customer chat services in an example embodiment.

The chat server 102 also provides for using chat services for customer support. FIG. 10 depicts one or more customers interacting with one or more customer service agents using chat services supported by the chat server 102. An organization may create a user account and chat address for the organization. Customers can send a chat message to the organization's chat address to initiate a chat session. Multiple customer service agents can login to the company chat account from their own device (Mobile/Web/PC/Mac) simultaneously. The chat request from an external party (e.g., customer) is presented to all the customer service agents. Once one customer service agent responds to the customer chat, then that chat session is immediately switched to a one-to-one chat session between the customer service agent and the customer.

Figure 11:
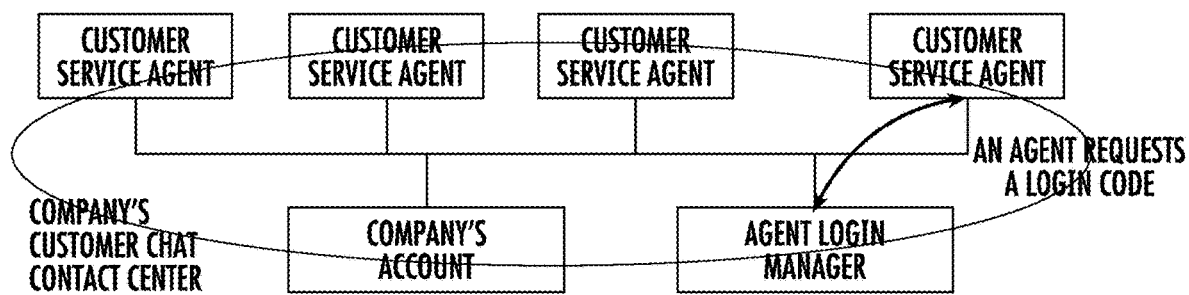
FIG. 11 depicts managing customer service agents for customer chat services in an example embodiment.

FIG. 11 depicts an example of how multiple customer service agents are connected to the chat server 102. The chat server 102 executes a customer service agent login manager (e.g., a program stored in memory). A customer service agent sends a login request to the customer service agent login manager (ALM). The customer service ALM returns an access code to the customer service agent and keeps track of the login status of the customer service agent. The customer service agent may then login to the chat service using the access code and granted access to the customer chat services. The ALM also handles the customer chat traffic and adds/removes active customer service agents from the customer chat services based on the customer demand in real-time.

Figure 12:
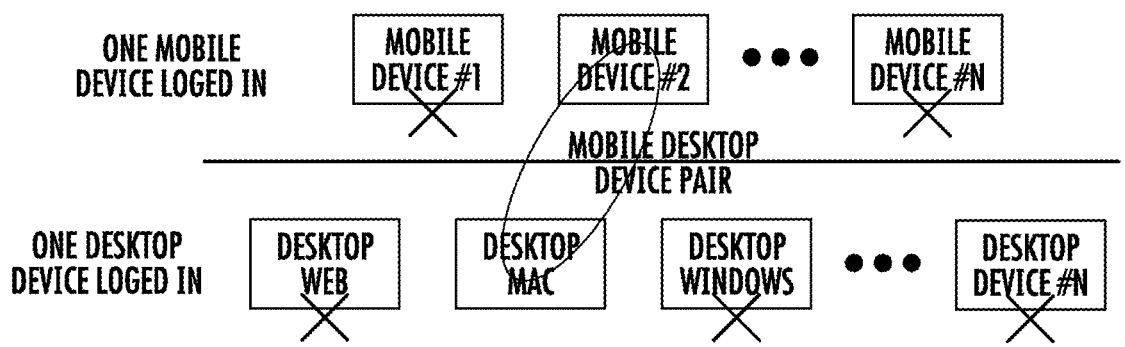
FIG. 12 depicts managing user login on multiple devices in an example embodiment.

In some embodiments, users may log into their messaging account using multiple devices. FIG. 12 depicts an example where a user can log into chat server 102 using two devices. One device may be a mobile device (e.g., a mobile phone; iOS, Android, etc.) and the other device may be a desktop running a web version of the user messaging application through a browser (e.g., PC/Windows or Mac App version). The chat server 102 assigns each logged in device a unique device ID. To login to a second device, the user's first device will receive a message and generate a security access code. If the user tries to sign in from a third device (e.g., a second mobile or second desktop device) the existing logged in device of the same type will be forced to log out. If a user is logged in on both a mobile device and a desktop device, the mobile-desktop devices are paired, and the chat content synchronized between the two devices independent to the device login time.

Figure 13:
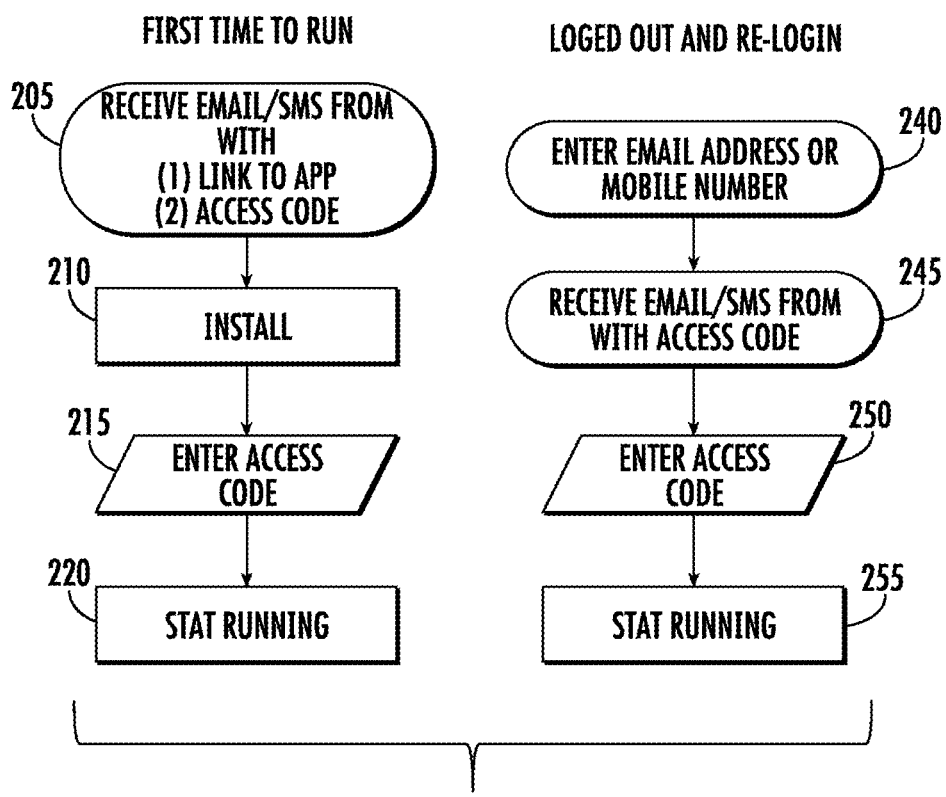
FIG. 13 depicts installation and execution of a user chat application in an example embodiment.

FIG. 13 depicts process flows for installing a user chat application on a user device 104 and for subsequent login. The user chat application runs on a user device 104 (mobile and/or desktop) and provides a user interface for messaging services, defining chat groups, etc. The user chat application interfaces with the chat server 102.

The process to install the user chat application begins at 205 where a user receives a message (e.g., email, text, etc.) with a link to the user chat application and an access code. The access code is created by the chat server 102, and uniquely identifies the user. The link to the user chat application may direct the user to a website where the user chat application can be downloaded and installed, as shown at 210. Once executed on the user device 104, the user enters the access code as shown at 215 and then begins running the user chat application at 220.

If the user logs out of the user chat application, they need a subsequent access code to log back into the user chat application. Referring to FIG. 13, at 240 the user enters an identifier, such as an email address or mobile phone number. At 245, the user receives a message (e.g., email, text, etc.) with a new access code. The user enters the access code as shown at 250 and then begins running the user chat application at 255.

The use of an access code as a means of identification and authentication for messaging services is beneficial in situations where users are reluctant to provide personal information. If a user wishes to be anonymous, the user could use a generic email account (e.g., me@gmail.com) to receive the access code and then install and run the user chat application. This is far less intrusive than chat services based on social media or other systems that require additional personal information. Also, no user passwords are needed as the access code enables functionality of the user chat application.

Figure 14:
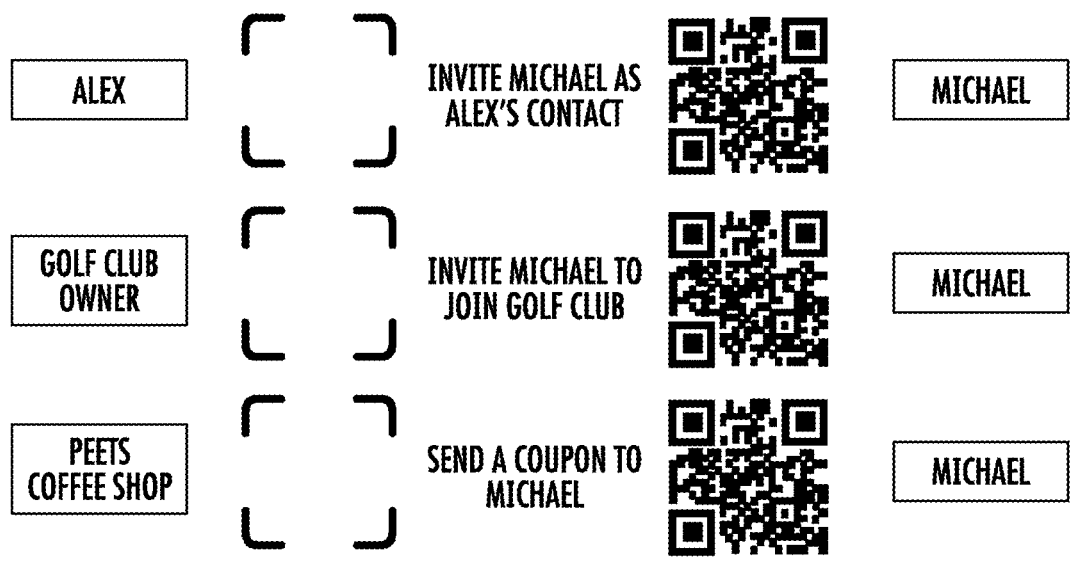
FIG. 14 depicts use of machine readable codes in an example embodiment.

The user chat application executing on the user device 104 may generate and/or read machine readable codes to facilitate a variety of functions. Machine readable codes may include QR codes, bar codes, etc. FIG. 14 depicts examples of how machine readable codes may be used to perform functions within the user chat application. One QR code may be used to invite a user to become a contact within the user chat application. The user chat application executing on a user device 104 generates a machine readable code corresponding to that user's account. Thus, a user can quickly invite another user to become a contact by simply presenting their personal machine readable code.

Another QR code may be used to invite a user to join a group (e.g., broadcast group or chat group). In the example of FIG. 14, a first entity (e.g., a golf course owner) provides a display of a QR code (for example, in the pro shop). Users that read the QR code with their user device 104 (executing the user chat application) automatically join a broadcast chat group owned by the golf course owner. The golf club course can now distribute coupons, announcements, event notifications, videos, pictures, etc. to the user. This allows a non-intrusive mechanism for businesses and other organizations to reach customers.

In another example in FIG. 14, a coffee shop presents a QR code used to distribute a coupon. Users that read the QR code with their user device 104 (executing the user chat application) receive a coupon via a message in their user chat application. Embodiments are not limited to the machine readable codes and examples shown in FIG. 14.

Figure 15:
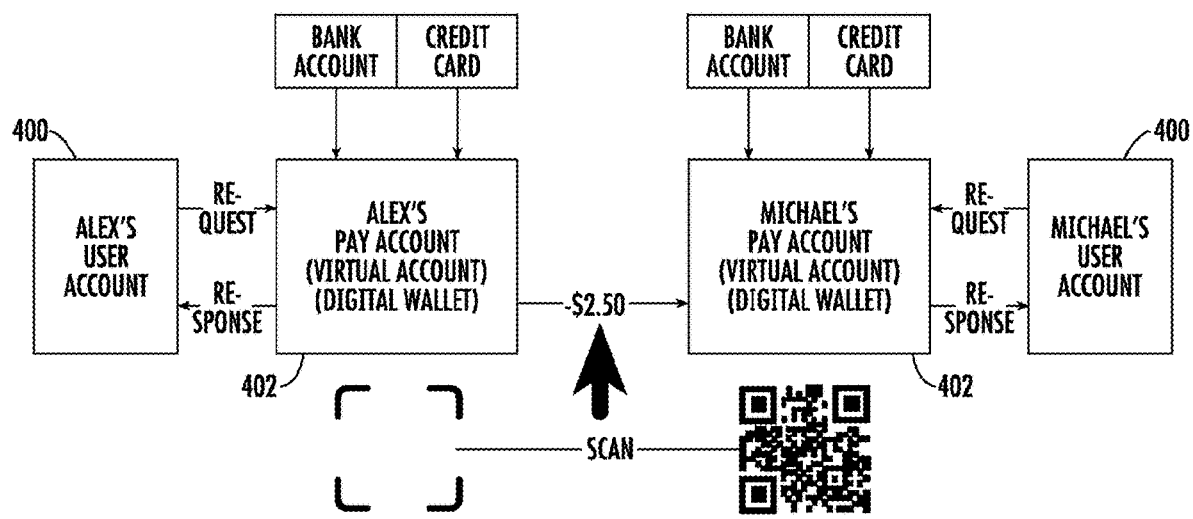
FIG. 15 depicts a chat services payment account in an example embodiment.

The user chat application may also include built in payment processing functionality. FIG. 15 depicts two users of the user chat application (Alex and Michael). A user's chat account 400 may be associated with a user-created chat payment account 402. The chat payment account 402 may include a digital wallet component, which is associated with payment sources 404, such as a bank account and/or credit card. The chat payment account 402 is used to send/receive money to/from other users of the user chat application.

The chat payment account 402 allows for a number of functions, including a set of chat commands as a request-response pair for a user's chat payment account 402. Funds may be transferred from the bank account or credit card account to the chat payment account 402. The chat account 400 may interface with the chat payment account 402 to provide permission to make a payment, security questions setup/applied, threshold to security level, check the balance instantly for a transaction, check the payment/receiving transaction history, setup autopay accounts, alert generation, etc.

Figure 16:
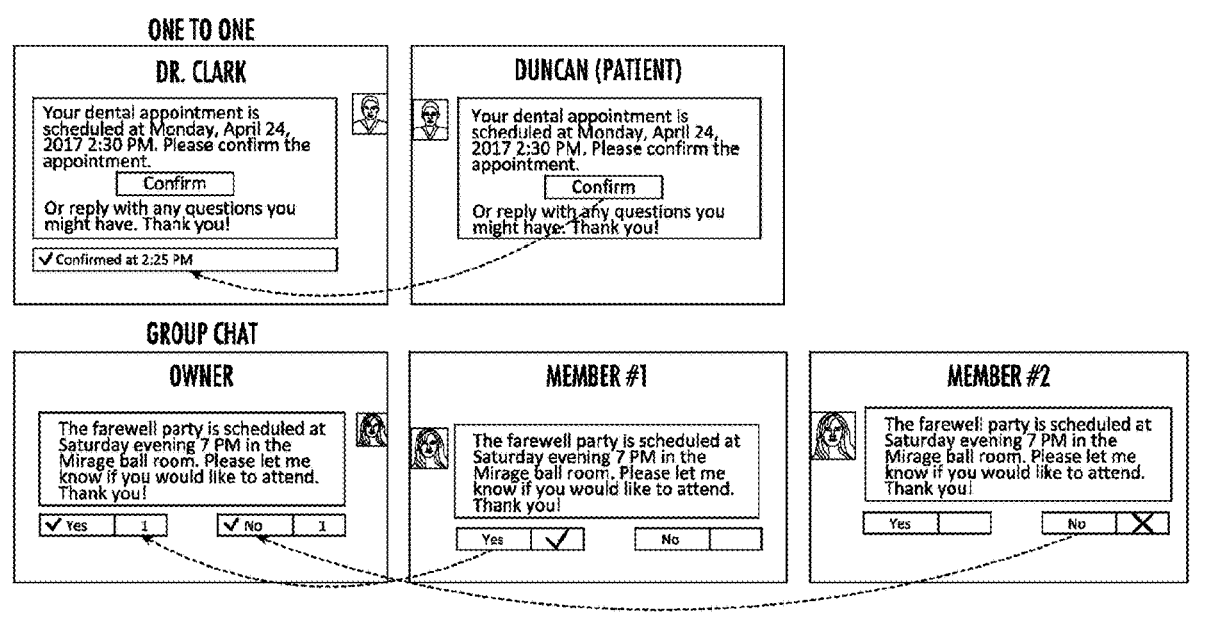

Another aspect of embodiments includes the ability for messages (whether direct, broadcast chat group or chat group) to include embedded executable commands that will automatically generate a response to the message sender or cause some other action. FIG. 16 depicts examples of messages have embedded executable commands. In a first example, a one-to-one chat message from Dr. Clark to a patient Duncan includes an embedded executable command in the form of a confirmation command. If the recipient selects the embedded executable command user their user device 104, the user chat application executing on the user device 104 generates and sends a reply message that is automatically sent to the originator of the message (Dr. Clark).

A second example in FIG. 16 illustrates a chat group message being sent to a group of recipients. The chat group message includes two embedded executable commands corresponding to a yes and no reply. When a recipient of the chat group message selects one of the embedded executable commands, the user chat application executing on the user device 104 generates and sends the corresponding yes or no reply to the chat group owner. The user messaging application executing on the group owner's device 104 (or the chat server 102) may keep a running tally of the yes and no reply messages.

Figure 17:
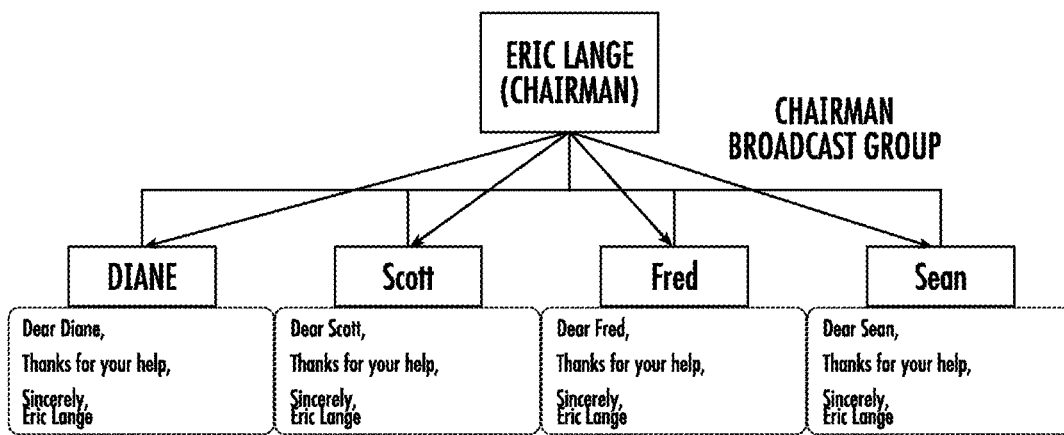
FIG. 17 depicts messages with variable fields in an example embodiment.

Embodiments also provide for customization of messages. FIG. 17 depicts broadcast chat group, where a chairman of an organization is owner of a broadcast chat group. The members of the broadcast chat group are known by the chat server 102. The broadcast chat message, generated by the owner of the broadcast chat group, may include a variable field that is populated by the chat server 102. When the broadcast chat message is sent, the chat server 102 populates the variable field for each recipient based on their user profile on the chat server 102. In the example of FIG. 17, the variable field in the broadcast chat message is the recipient's first name. Thus, each recipient receives the broadcast chat message with their unique first name populated by the chat server 102. Variable fields may be incorporated in the chat group messages as well as broadcast group messages.

Figure 18:
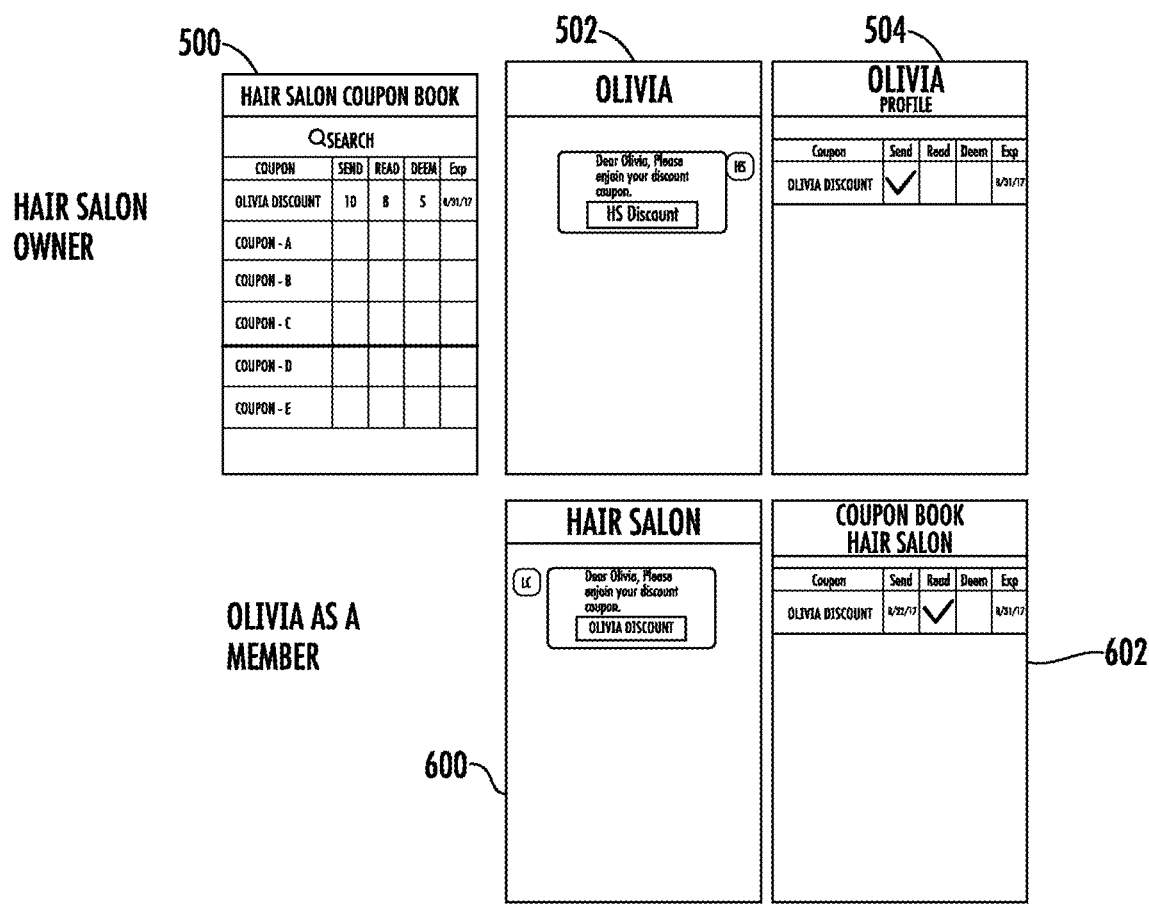
FIG. 18 depicts management of coupons in an example embodiment.

Embodiments also provide for coupon management. FIG. 18 depicts management of coupons in an example embodiment. The chat server 102 allows an owner of a business to create and store coupons in a coupon book. FIG. 18 depicts an example of a coupon book for a hair salon. The coupon book 500 is stored as a database on a user device 104 and/or on the chat server 102 and can be manipulated by the business owner. The coupons may be distributed to user devices 104 who are contacts of the business owner via a broadcast chat message as shown at 502. The coupon book 500 identifies each coupon with an identifier and also tracks how many users the coupon has been sent to, how many users have read the coupon, how many coupons have been redeemed and a coupon expiration date. The user device 104 and/or chat server 102 also stores a profile 504 of users who are contacts with a business owner. The profile 504 may include fields to indicate which contacts have been sent a coupon, whether the contact read the coupon, whether the contact redeemed the coupon and the coupon expiration date. The profile 504 is helpful in identifying users who react to coupons and those who do not.

A coupon book is also created for each user. As shown in FIG. 18, when a user receives a coupon via a chat message 600, an entry is created in a user coupon book 602. The user coupon book 602 may be stored on the user device 104 and/or on the chat server 102. The user coupon book 602 may include fields to indicate a coupon identifier, when the coupon was sent, whether the user read the coupon, whether the user redeemed the coupon and the coupon expiration date.

Figure 19:
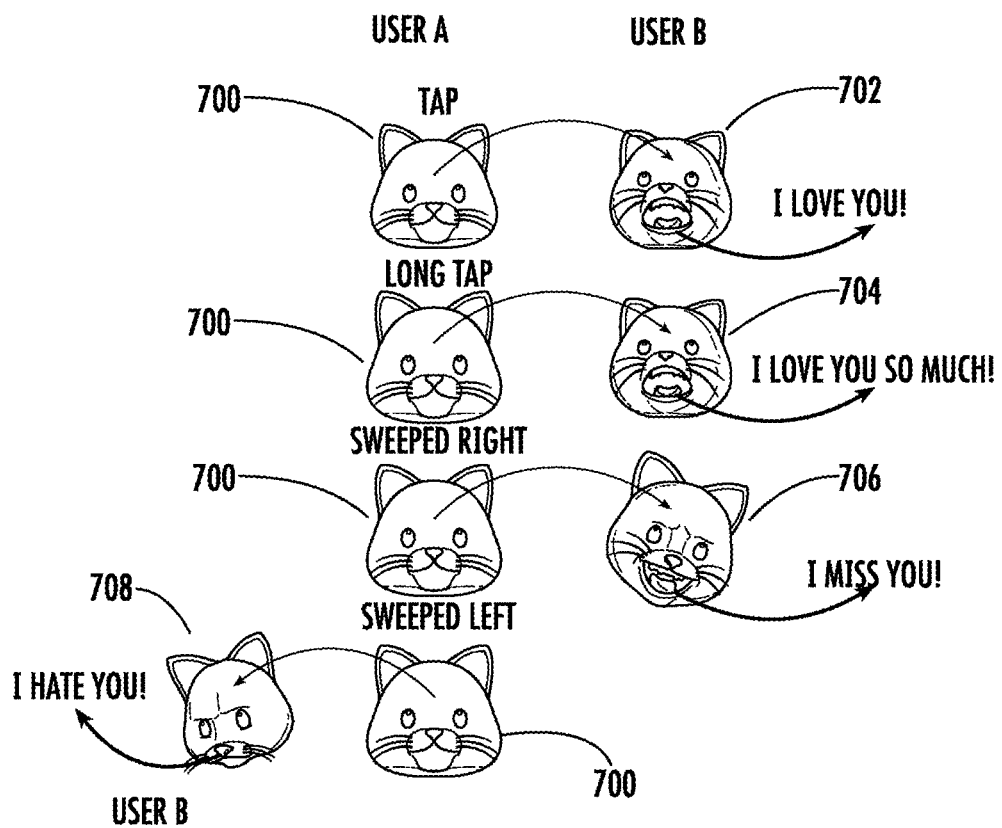
FIG. 19 depicts messages with embedded executable commands in the form of interactive emojis in an example embodiment.

FIG. 19 depicts messages with embedded executable commands in an example embodiment similar to FIG. 16, where in the embedded interactive command is in the form of an interactive emoji. An emoji may be a single picture character, such as those that have become popular to add to text messages and posts within private text messages and social network posts. Chat messages (whether direct, broadcast chat group or chat group) may include one or more interactive emojis that will automatically generate a response to the message sender or cause some other action in response to recipient interaction with the interactive emoji. The operations depicted in FIG. 19 may be implemented by the user chat applications executing on the user devices 104 of User A and User B. FIG. 19 depicts examples of messages have embedded executable commands in the form of an interactive emoji 700. An original message from USER A includes an interactive emoji 700. When USER B interacts with the interactive emoji 700, a reply message is generated. For example, if USER B performs a tap on the interactive emoji 700, the user chat application creates a reply emoji 702 that changes appearance of the interactive emoji and optionally adds a sound clip (e.g., "I love you") in an automated voice or the recipient's voice (e.g., a voice response synthesized from USER B's voice). In another example, if USER B performs a long tap on the interactive emoji 700, the user chat application creates a reply emoji 704 that changes appearance of the interactive emoji and optionally adds a sound clip (e.g., "I love you so much") in an automated voice or the recipient's voice. In another example, if USER B performs a sweep right on the interactive emoji 700, the user chat application creates a reply emoji 706 that changes appearance of the interactive emoji and optionally adds a sound clip (e.g., "I miss you") in an automated voice or the recipient's voice. In another example, if USER B performs a sweep left on the interactive emoji 700, the user chat application creates a reply emoji 708 that changes appearance of the interactive emoji and optionally adds a sound clip (e.g., "I hate you") in an automated voice or the recipient's voice.

Figure 20:
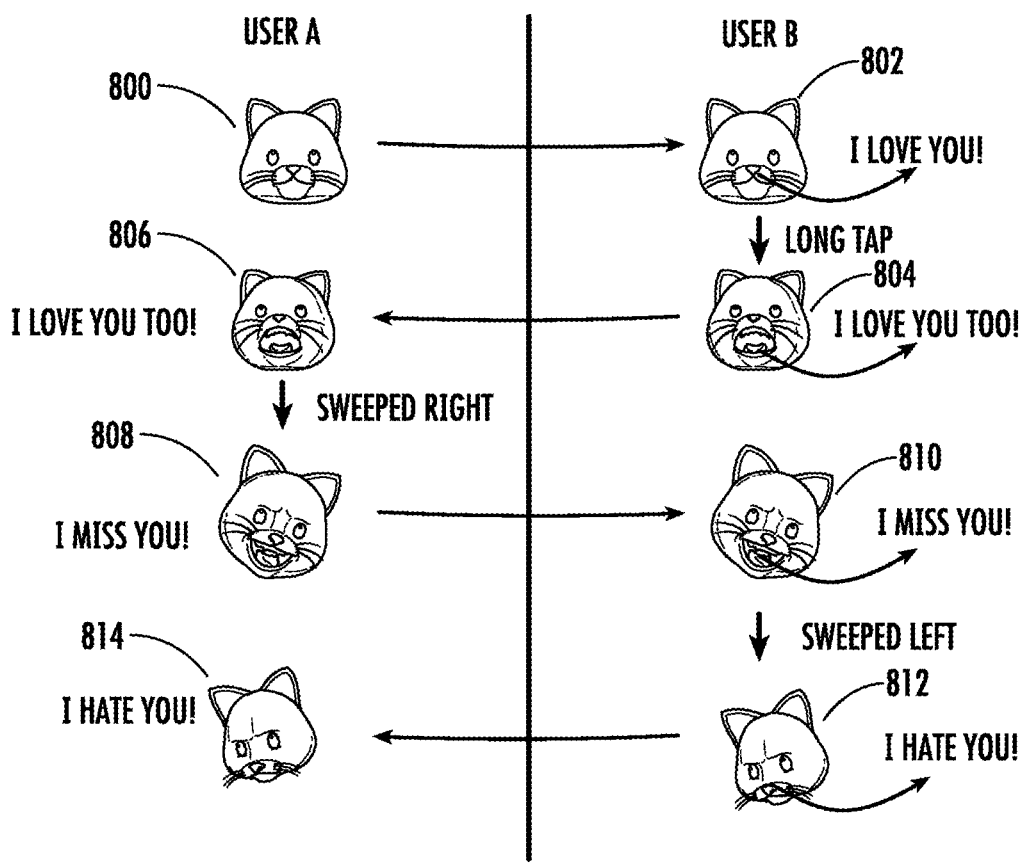
FIG. 20 depicts an interactive emoji conversation in an example embodiment.

The reply emojis 702, 704, 706 and 708 may also be interactive emojis, so that upon receipt of the reply emoji 702, 704, 706 or 708 by the sender (USER A) of the initial interactive emoji 700, the sender could then interact with the reply emoji to create a new message sent back to USER B. Communication back and forth between the sender(s) and recipient(s) may continue by interactive emojis that are altered in response to user interaction with a received interactive emoji. FIG. 20 depicts an interactive emoji conversation between User A and User B, implemented by the user chat application executing on user devices 104. At 800, User A sends an interactive emoji to User B. At 802, User B receives the interactive emoji, which includes sound clip of "I love you!". At 804, User B interacts with the interactive emoji 802 with a long tap to generate interactive emoji 804, that includes a sound clip of "I love you too!". Interactive emoji 804 is sent to User A at 806. At 808, User A interacts with the interactive emoji 806 with a sweep right to generate interactive emoji 808, that includes a sound clip of "I miss you!". At 810, User B receives the interactive emoji, which includes sound clip of "I miss you!". At 812, User B interacts with the interactive emoji 810 with a sweep left to generate interactive emoji 812, that includes a sound clip of "I hate you!". Interactive emoji 812 is sent to User A at 814.

FIG. 20 is just one example of a conversation between two users using chat messages having embedded interactive messages in the form of interactive emojis. Similar communication may occur in direct, broadcast chat group or chat group messages. Interaction with the interactive emoji may generate a reply message with at least one of a change in appearance of the emoji and an addition of one or more sound clips. The reply message with the modified emoji can be sent to the sender (or a group), and back and forth.

Figure 21:
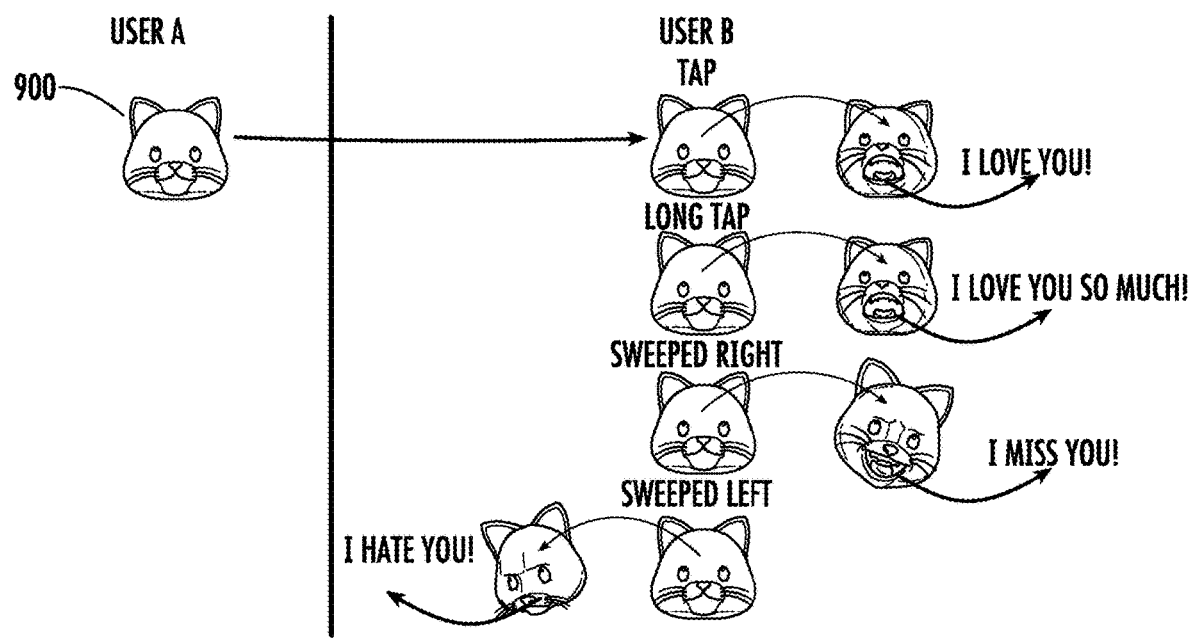
FIG. 21 depicts interacting with an interactive emoji in an example embodiment.

FIG. 21 depicts interacting with an interactive emoji in an example embodiment. In FIG. 21, User A sends an interactive emoji 900 to User B. User B can then interact with the interactive emoji using a variety of interactions, including tap, long tap, sweep right, sweep left, etc. The interactive emoji 90 will change appearance and optionally also play a sound clip associated with the interaction.

In some embodiments, only the recipient of an interactive emoji can interact with the interactive emoji, using taps and swipes as described above. When the recipient is done interacting with the interactive emoji, an input (e.g., a long tap) indicates they are done and an acknowledgement emoji is sent back to the sender. An interactive emoji may include a set of emojis unique to the recipient (e.g., boy face and girl face). The interactive emojis may be used between two users in the form of a game, such as rock-paper-scissors, with user interactions revealed only once all users have interacted or as a sequence of turns (e.g., checkers, connect four). The interactive emojis may be used for commercial feedback, such as customer experience. The interactive emojis may be used for commercial transactions, where user interaction with the interactive emoji completes a purchase. The interactive emojis may be used for education, where user interaction with the interactive emoji completes a lesson for any type of educational experience.

As described above, the exemplary embodiments can be in the form of processor-implemented processes and devices for practicing those processes. The chat server 102 executes computer programs to implement the functions described herein. Also, the user devices 104 execute computer programs to implement the functions described herein. Exemplary embodiments may be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. A method for communicating via chat, the method comprising:
    transmitting a first chat message from a first user device to a second user device, the first chat message including an embedded executable command;
    upon interaction with the embedded executable command at the second user device, generating and transmitting an automated second chat message from the second user device to the first user device;
    wherein the embedded executable command includes an interactive emoji;
    wherein interaction with the interactive emoji at the second user device initiates the generating and transmitting the automated second chat message from the second user device to the first user device;
    wherein different types of interaction with the interactive emoji create different types of automated second chat messages;
    wherein the automated second chat message from the second user device to the first user device includes a second interactive emoji;
    wherein the different types of interaction with the interactive emoji include one or more of tap, long tap, sweep left and sweep right, each type of interaction with the interactive emoji creating different types of second interactive emojis.

2. A computer program product, the computer program product including a storage medium readable by a processing circuit and storing instructions for execution by the processing circuit for facilitating operations of claim 1.

3. A system comprising:
    memory comprising computer-executable instructions; and
    a processor executing the computer-executable instructions, the computer-executable instructions, when executed by the processor, cause the processor to perform operations of claim 1.

4. The method of claim 1 wherein the first chat message is a direct chat message from the first user device to the second user device.

5. The method of claim 1 wherein the first chat message is a chat group message providing bidirectional messaging from each member of the chat group to each other member of the chat group.

6. The method of claim 1 wherein the first chat message is a broadcast message providing unidirectional messaging from a broadcast group owner to each other member of the broadcast chat group.

7. The method of claim 1 further comprising adding a sound clip to the second interactive emoji of the automated second chat message.

8. The method of claim 1 further comprising upon interaction with the second interactive emoji in the automated second chat message at the first user device, generating and transmitting an automated third chat message from the first user device to the second user device.

9. The method of claim 8 wherein the automated third chat message includes a third interactive emoji.

10. The method of claim 1 wherein the second interactive emoji corresponds to the first interactive emoji having at least one of a different appearance and an additional sound clip.

11. A method for communicating via chat, the method comprising:
    transmitting a first chat message from a first user device to a second user device, the first chat message including an embedded executable command;
    upon interaction with the embedded executable command at the second user device, generating and transmitting an automated second chat message from the second user device to the first user device;
    wherein the embedded executable command includes an interactive emoji;
    wherein interaction with the interactive emoji at the second user device initiates the generating and transmitting the automated second chat message from the second user device to the first user device;

wherein different types of interaction with the interactive emoji create different types of automated second chat messages;
wherein the different types of interaction with the interactive emoji include one or more of tap, long tap, sweep left and sweep right, each type of interaction with the interactive emoji creating different types of automated second chat messages;
wherein the automated second chat message from the second user device to the first user device includes a second interactive emoji;
upon interaction with the second interactive emoji in the automated second chat message at the first user device, generating and transmitting an automated third chat message from the first user device to the second user device;
wherein the automated third chat message includes a third interactive emoji;
wherein different types of interaction with the second interactive emoji create different types of automated third interactive emojis;
wherein the different types of interaction with the second interactive emoji include one or more of tap, long tap, sweep left and sweep right, each type of interaction with the interactive emoji creating different types of third interactive emojis.

* * * * *